July 24, 1962 M. J. CIVITANO 3,046,372
FUSED OUTLET DEVICE AND THE LIKE
Filed May 25, 1959
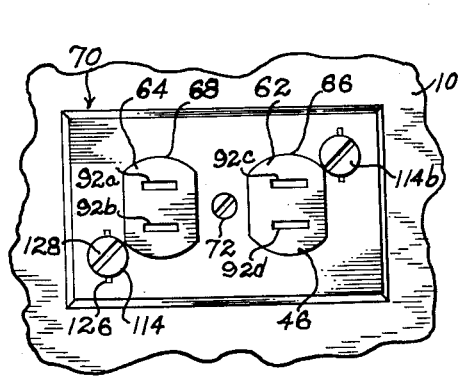
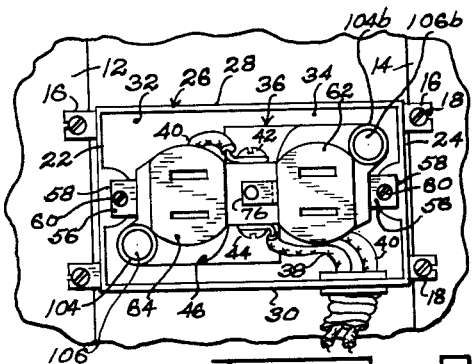
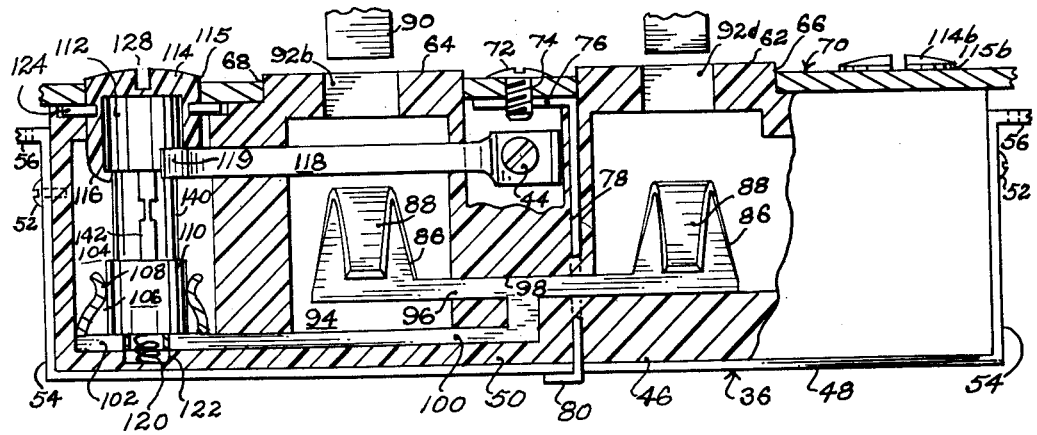
INVENTOR.
Michael J. Civitano
BY
Peter Fries, Jr.
ATTORNEY

United States Patent Office 3,046,372
Patented July 24, 1962

3,046,372
FUSED OUTLET DEVICE AND THE LIKE
Michael J. Civitano, 1244 44th St., Brooklyn 19, N.Y.
Filed May 25, 1959, Ser. No. 815,582
3 Claims. (Cl. 200—115.5)

This invention relates to electrical connections and outlets for the same.

An object of the invention is to provide a novel and improved electrical connection outlet device in which there is fused means for protecting the circuit from damage to the same from excessive current flow.

Another object of the invention is to provide a novel and improved electrical connection outlet device which may be connected to the wiring of a building and mounted on or in a wall, so that electrical appliances may be connected thereto by plugging into the outlet device, the device being provided with self contained fuse means for opening the circuit right at the outlet whenever excessive current flows due to short circuit overload or other cause.

A further object of the invention is to provide a novel and improved electrical connection outlet device in which there is a main outlet body mountable in an outlet box or the like for being secured to a wall or in the wall of a building, and including one or more plug sockets into which a pair of contact prongs of an appliance plug can be inserted to connect the appliance with the outlet and the line, the device body including fuse receiving recesses for engaging replaceable fuses which are insertable into the recesses, and lockable therein, and which are easily removed when burned out or for inspection.

Still another object of the invention is to provide a novel and improved fused electrical connection outlet in which the fuses are carried within the device, so that there is no danger of fire or of damage to the fuses due to insertion or removal of an appliance plug into the device, a cover plate being removably secured over the outlet to further protect the same.

Still a further object of the invention is to provide a novel and improved fused electrical outlet of the type described, which is simple in design, uses very few parts, and is rugged in construction, so that it may be employed in electrical installations to afford localized protection due to overloads from the very appliances connected to the particular outlet.

These and other objects and advantages of the invention will become apparent from the following description of a preferred embodiment thereof, as illustrated in the accompanying drawings, forming a part hereof, and in which, FIGURE 1 is a front elevational view showing a portion of a wall, with a fused electrical connection outlet installed therein.

FIGURE 2 is a face elevational view similar to that of FIGURE 1, but with the wall surface and face plate removed.

FIGURE 3 is a longitudinal sectional elevational view taken substantially on plane 3—3 of FIGURE 2, and showing the construction thereof with fuses in active positions.

In view of the large increase in sale and installation of electrical appliances in the home, office, and other buildings, such as electric fans, electric clocks, refrigerators, television and radio receivers, air conditioning apparatus, lamps, and the like, it frequently happens that the load on a particular line is unduly increased to the point where either the main house fuse in the basement will blow out, thereby shutting down the entire electrical supply to the building, or overheating may cause a fire. Where the average small dwelling may have twenty or more base electrical connection outlets connected to its main line, it is seen that accidental blowing of the main house fuse under an accidental or incidental overload, may well result in shutting down the oil burner which heats the house, the refrigerator, the electrical clocks, the lights, radios, and electrical doorbells.

The presently disclosed device is intended to improve this condition, so that any overloading of any particular outlet by appliances plugged into that outlet, will cause instantaneous blowing of one or more fuses carried right in the outlet, and thus at most, inactivate one outlet, while the rest of the power supply in the home continues, and also may be arranged to permit easy inspection to determine which outlet is or has been overloaded. Once the defective appliance is unplugged from the outlet, it is a simple matter to remove the burned out fuses and replace them with good working fuses, restoring the outlet to service. At the same time, as the outlet with fuses is within the wall and under the cover plate, there is no danger from fire due to blowing of the fuses.

As shown, there is a wall 10 of a room, building, or the like, into which the electrical outlet fixture is to be mounted, as by securing it to a pair of joists 12 and 14, by means of angle brackets 16 secured to the joists by screws 18, the brackets in turn being secured to the end walls 22 and 24 of the junction box 26. The latter box being formed of iron, has side walls 28 and 30, and a floor wall 32, defining a chamber 34 for the reception of the outlet fixture member 36. Knockout holes are provided in the walls of the box 26, for entry of BX cable, armored and containing a pair of wires to connect from the main power lines to the outlet.

The wires 38 and 40 are connected to opposite screw terminals 42 and 44 of the outlet fixture member 36. The fixtures 36 includes a fixture body 46 formed of suitable insulating material, such as Bakelite, plastic, hard rubber, or other well known material of suitable insulating characteristics, for this purpose. A yoke 48, formed of metal extends under the bottom wall 50 of the fixture member 36, and is secured thereto in any suitable manner, as by screws 52, extending through its end walls 54, and into the fixture body, so as to support the fixture body securely thereon. End flanges 56 are bent out of the end walls 54, and extend across the tongue members 58 of the box 26, being secured to the same by means of screws 60. As the box 26 is also secured electrically to the armored casing of the BX cable which is grounded, the metal yoke 48 is also grounded.

The fixture body has a pair of spaced elevated portions 62 and 64 which extend through openings 66 and 68 in fixture body cover plate or face plate 70. The plate 70 extends over the box 26 also, and overlies part of the adjacent portions of the wall 10 of the room, so as to provide a neat substantial coverage for these elements, and protection therefor. The plate 70 may be made of metal or other suitable material, and may be secured in place by means of a screw 72 extending through an opening 74 in the face plate 70, and threaded into a flange 76 in a bracket member 78, extending through the fixture body 46, and bent at its lower extremity through and around the yoke 36 for making electrical contact therewith, thus grounding the screw 72, and the face plate 70 if made of metal. The flange 80 of the bracket member 78 may be also secured to the yoke 36 by means of welding, brazing, soldering, or by a screw connection.

For each of the terminals 42 and 44, there is a pair of corresponding spring contact members 86 formed of spring brass or copper or other suitable metal, bent over as at 88 to form a contact tongue 88, in the path of insertion of the contact prongs 90 of a contact plug through openings 92, when a lamp or other appliance is to be connected to the outlet. Each spring contact member 86 is disposed in the chamber 94 formed under its related projection 62 or 64 of the outlet member, and may be supported therein in any suitable manner, as by means of a supporting bus bar 96 extending through and supported by openings or passageways 98 in the outlet body 46, with connecting bus extension 100 connecting to the left as seen in FIGURE 3, to the base clip 102 or clamp of the fuse socket 104 as shown. It is seen that there is a well formed to receive the fuse 106 by clamping resiliently between spring fingers 108 the bottom cup 110 or terminal of the fuse, while the top terminal 112 of the fuse is seated firmly in plastic or insulating cap 114 by extending snugly inside the cylindrical opening formed therein, and with a spring finger 116 of the cap 114 snapping under the lower edge of the terminal 112, to retain them together. The screw terminal 44 of the outlet body is connected by bus 118 into one end of which it is threaded, to bring its spring contact fingers 119 into contact with an uncovered portion of the top fuse terminal 112, when inserted as shown. A spring 120 seated in a recess 122 below the fuse terminal 110, exerts upward bias on the fuse to dislodge or unseat it when the insulating cap 114 has its radially projecting pins 124 turned into registry with the radial slots 126 in the cover plate 70, allowing the spring 120 to push the fuse partly upwardly for easy withdrawal from the outlet through the lifting of the cap 114 and with it the fuse. A diametral screw slot 128 in the top of cap 114 allows such turning by means of a screw driver or coin inserted therein, to either depress the pins 124 below the undersurface of the plate 70 and allow them to be turned out of registry with the slots 126 to lock the fuses in, or to be turned into registry for removal or inspection of the fuse.

It is thus seen that the spring prong terminals 88 seen in FIGURE 3 connect through the fuse 106 with the outlet terminal screw 44, and provide for being contacted by plug prongs inserted through openings 92b or 92d for one side of the circuit. Similarly, there is another set of spring prong terminals under openings 92a and 92c to connect through the fuse 106b in fuse socket 104b, and a corresponding pair of bus bars 100b and 118b, with the other main outlet terminal screw 42 connected by wire 40 to the other side of the power line. A similar fuse cap member 114b extends through a similar opening 115b through the face or cover plate 70, and the rest of the construction is in all respects similar to that shown in FIGURE 3 for the fuse and socket connections, and those going to the springs prongs, except that they go to the other side of the circuit.

As is well known in the fuse art, each fuse may be made with a glass tubing 140 cemented inside each of its metal terminal cups, and with a fusible element 142 extending through the glass tubing and soldered at its ends inside each of its terminal cups. The fusible element 142 is made with a reduced cross section, at an intermediate location thereon, which is so made that it will burn out when its rated maximum current is reached by the load passing through the fuse. This protects the line, wires, and appliances connected to the outlet. The fuse, which costs only a few cents, is easily replaced, by merely turning the cap 114 until its pins 124 are free, and allowing the spring 120 to push it partly out, when it may be lifted out the rest of the way by pulling on the cap, and replaced with another fuse.

Although in a preferred form of the invention, the fuse caps 114 protrude through openings in the cover plate 70, it is also understood that in a modified form of the invention, the fuse caps may be below the cover plate 70, and no openings as shown at 115 will appear in the plate 70. In such modified form, suitable openings are formed in the outlet body 46 to engage in bayonet fashion with the pins 124.

Although I have described by invention according to a preferred form thereof in detail, it is understood that I do not wish to be limited thereto, but that various changes may be made in size, shape, materials and arrangement without departing from the spirit and scope of the invention as claimed.

I claim:

1. An electrical connection device comprising a main housing having a main chamber formed therein, with first and second plug blade access openings formed therein to allow entering of plug blades of an external load, first and second spring blade means disposed in said main chamber in registry with said first and second plug blade access openings for engaging releasably with said plug blades, first and second main terminal means in said main housing for connection to the wires of a power line to draw electrical current therefrom, said main housing having first and second fuse receiving chambers at opposite ends thereof, fuse engaging socket means in said fuse receiving chambers and including first and second fuse clamp means for resiliently clamping a fuse contactively into the circuit, first bus means connecting said first clamp means respectively to said first and second main terminal means, second bus means connecting said second clamp means respectively to said first and second spring blade means, whereby said fuse engaging socket means interposes a fuse in both sides of the lines of the circuit, door means engageable with and overlying each of said first and second fuse receiving chambers and releasable for affording access thereto for insertion and removal of a fuse, and cover means disposable over said main housing and engageable therewith for covering the same, and resilient means for biasing said fuses into disengaging position.

2. The construction according to claim 1, wherein said resilient means comprises a spring disposed in an inner portion of each of said fuse receiving chambers, and exerting resilient ejecting bias on said fuse means when disposed therein, for effecting partial ejection of a fuse means when said door means is opened, whereby the partially ejected fuse means is reachable from outside said housing and removable.

3. The construction according to claim 1, wherein said door means comprises a fuse receiving head adapted for seating over one end of a fuse, snap finger means carried by said fuse receiving head for snappingly engaging a terminal portion of said fuse so that said fuse and fuse receiving head are releasably engaged thereby for movement thereafter together, so that insertion and removal of a fuse is accomplished by handling the said fuse receiving head, said fuse receiving head being made of insulating material, and radially extensible pin means carried by said fuse receiving head and engageable under a portion of said cover means upon turning of said fuse receiving head for lockingly engaging the same, and unlockable upon turning of said head to unlocked position, and resilient fuse biasing means disposed in each fuse receiving chamber for acting between said chamber and said fuse therein, for biasing said fuse so that upon removal of said pin means from locking position, said biasing means pushes said fuse head and said fuse therewith, partially out of said door means for being pulled therefrom.

References Cited in the file of this patent

UNITED STATES PATENTS

| | | |
|---|---|---|
| 2,316,163 | Hignutt | Apr. 13, 1943 |
| 2,437,802 | Adler | Mar. 16, 1948 |
| 2,562,947 | Richard et al. | Aug. 7, 1951 |
| 2,667,547 | Lindeman | Jan. 26, 1954 |
| 2,740,017 | Luce et al. | Mar. 27, 1956 |
| 2,875,295 | Lindeman | Feb. 24, 1959 |